(12) United States Patent
Hietaniemi et al.

(10) Patent No.: US 11,441,273 B2
(45) Date of Patent: Sep. 13, 2022

(54) USE OF A POLYMER PRODUCT FOR DEPOSIT FORMATION CONTROL IN MANUFACTURE OF PAPER OR BOARD

(71) Applicant: KEMIRA OYJ, Helsinki (FI)

(72) Inventors: Matti Hietaniemi, Espoo (FI); Asko Karppi, Turku (FI); Maarit Latvanen, Lohja (FI); Elsa Olmos, Espoo (FI)

(73) Assignee: Kemira Oyj, Helsinki (FI)

( * ) Notice: Subject to any disclaimer, the term of this patent is extended or adjusted under 35 U.S.C. 154(b) by 530 days.

(21) Appl. No.: 16/341,464

(22) PCT Filed: Nov. 22, 2017

(86) PCT No.: PCT/FI2017/050807
§ 371 (c)(1),
(2) Date: Apr. 12, 2019

(87) PCT Pub. No.: WO2018/096211
PCT Pub. Date: May 31, 2018

(65) Prior Publication Data
US 2021/0301473 A1    Sep. 30, 2021

(30) Foreign Application Priority Data

Nov. 22, 2016  (FI) ..................................... 20165884

(51) Int. Cl.
| | | |
|---|---|---|
| *D21H 11/14* | (2006.01) | |
| *D21H 21/02* | (2006.01) | |
| *C08F 220/56* | (2006.01) | |
| *D21F 1/02* | (2006.01) | |
| *D21F 1/10* | (2006.01) | |
| *D21H 17/45* | (2006.01) | |
| *D21H 17/68* | (2006.01) | |
| *D21H 17/00* | (2006.01) | |
| *D21H 23/04* | (2006.01) | |

(52) U.S. Cl.
CPC .......... *D21H 21/02* (2013.01); *C08F 220/56* (2013.01); *D21F 1/022* (2013.01); *D21F 1/10* (2013.01); *D21H 11/14* (2013.01); *D21H 17/455* (2013.01); *D21H 17/68* (2013.01); *D21H 17/74* (2013.01); *D21H 23/04* (2013.01); *C08F 2800/20* (2013.01)

(58) Field of Classification Search
CPC ........ D21H 21/02; D21H 17/37; D21H 17/43; D21H 17/45; D21C 9/08
USPC ..................................................... 162/164.6
See application file for complete search history.

(56) References Cited

U.S. PATENT DOCUMENTS

| | | | |
|---|---|---|---|
| 5,256,252 A | 10/1993 | Sarkar et al. | |
| 5,798,023 A | 8/1998 | Pruszynski et al. | |
| 10,590,604 B2* | 3/2020 | Karppi | .............. D21H 17/375 |
| 2004/0132896 A1 | 7/2004 | Kubota et al. | |
| 2004/0226676 A1 | 11/2004 | Song et al. | |
| 2006/0000570 A1 | 1/2006 | Song et al. | |
| 2011/0155339 A1* | 6/2011 | Brungardt | .............. D21H 21/18 |
| | | | 162/164.6 |
| 2012/0118523 A1 | 5/2012 | Lu et al. | |

FOREIGN PATENT DOCUMENTS

| | | |
|---|---|---|
| CN | 1720267 A | 1/2006 |
| EP | 2157237 A1 | 2/2010 |
| JP | 2006037290 A | 2/2006 |
| JP | 2010077567 A | 4/2010 |
| JP | 2013139656 A | 7/2013 |
| RU | 2473725 C1 | 1/2013 |
| WO | 02086230 A1 | 10/2002 |
| WO | 2014076372 A1 | 5/2014 |
| WO | 2016120524 A1 | 8/2016 |

OTHER PUBLICATIONS

Finnish Patent and Registration Office, Search report of FI20165884 dated May 23, 2017, 2 pages.
Tiina Sarja, PhD Thesis, Oulu University, Finland: Measurement, nature and removal of stickies in deinked pulp, Acta Universitatis Ouluensis, C Technica 275, Oulu University Press, 2007.
Japan Patent Office; Notification of reason for refusal of counterpart patent application 2019-527427; dated Jul. 27, 2021 10 p.
Search report section of Indian Examination Report for Indian patent application No. 201947019845, dated Dec. 30, 2021, 3 pages.

* cited by examiner

*Primary Examiner* — Mark Halpern
(74) *Attorney, Agent, or Firm* — Meunier Carlin & Curfman LLC

(57) ABSTRACT

The invention relates to a use of a water-soluble polymer product comprising amphoteric polyacrylamide, which has neutral or cationic net charge at pH 7, a weight-average molecular weight of 2,500,000-18,000,000 g/mol and a total ionicity of 4-28 mol-%. The polymer product is used for controlling deposit formation caused by hydrophobic substances in manufacture of paper or board, where a fibre web is formed from an aqueous suspension of fibres. The invention relates also to a method for controlling deposit formation caused by hydrophobic substances in manufacture of paper or board, where a fibre web is formed from an aqueous suspension of fibres, as well as to produced paper or board.

18 Claims, 1 Drawing Sheet

Figure 1:
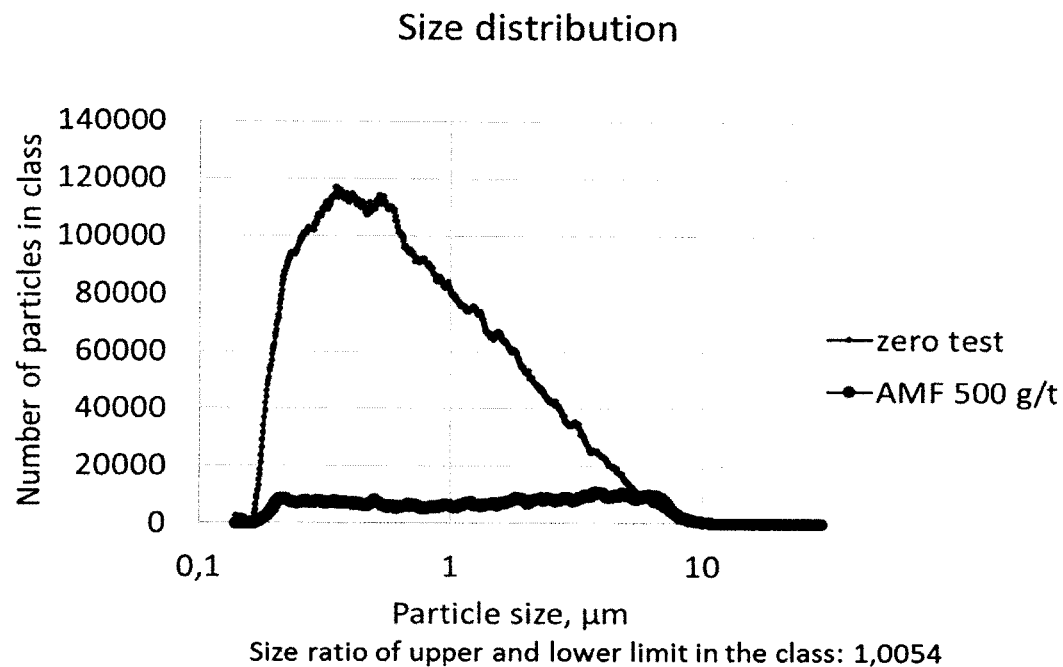

USE OF A POLYMER PRODUCT FOR DEPOSIT FORMATION CONTROL IN MANUFACTURE OF PAPER OR BOARD

PRIORITY

This application is a U.S. national application of the international application number PCT/FI2017/050807 filed on Nov. 22, 2017 and claiming priority of FI national application 20165884 filed on Nov. 22, 2016 the contents of all of which are incorporated herein by reference.

The present invention relates to use of a polymer product for deposit formation control in manufacture of paper or board, an improved paper or board making process using an amphoteric water-soluble polymer product for deposit formation control as well as to a paper or board product according to the preambles of the enclosed independent claims.

The modern papermaking processes with high-speed machines are very sensitive to disturbances. One of the important factors limiting productivity on a high-speed paper machine is the formation of deposits. Formed deposits may cause web breakages, so as a precautionary measure the most affected surfaces, such as drying cylinders, calenders, wires and felts, are being regularly washed and cleaned, which leads to downtime and loss of production. Formed deposits may also reduce the paper quality in such amount that web breaks occur, and/or cause holes and dark spots, even to such extent that the produced paper is not suitable for the intended end-use and must be rejected. Even low level of deposits may lead to a reduction of the quality of the produced paper, which causes quality degradation in the final end-product or problems in further processing of the produced paper. For example, deposits in the paper web may cause sudden web breakages during printing, and contamination of printing machines.

In papermaking deposits are caused by any material that is able to deposit on a process surface. Typically deposits are caused by hydrophobic substances, including so-called stickies and pitch.

In making of paper and board the use of inexpensive fibre sources, such as old corrugated containerboard (OCC) and other recycled paper and board grades, has been increasing over the past decades. Use of recycled fibre material as raw material is the main source of hydrophobic substances, so called stickies, in the paper and board making. While some or even most of these hydrophobic substances are removed during the pulping of recycled fibre raw material, substantial amounts are still carried over to the paper or board making process. In general, hydrophobic substances are released from recycled raw material in the pulping stage and removed from the pulp during the succeeding stages, such as screening, centrifugal cleaning, flotation, washing or thickening filtrate treatment with dissolved air flotation. Hydrophobic substances may also originate from the paper machine broke, especially from coated broke.

Yet another source of the hydrophobic substances is the fibres themselves, especially originating from kraft pulping, fully mechanical pulping, thermomechanical or semi-mechanical pulping. Fibres from kraft and mechanical pulping are a major source of natural hydrophobes, so-called pitch, which includes wood extractives, sterols, fatty acids, resin acids, fatty esters, either in their salt or free form.

Although both stickies and pitch are hydrophobic by nature, they behave differently in the papermaking process. For example, elevated temperatures make pitch less tacky and more dispersed, while stickies become stickier at elevated temperatures and are thus more likely to deposit on the process surfaces. Also different size fractions of the hydrophobic substances may behave differently. So-called macrostickies have a high tendency to deposit formation but they are mechanically removable, e.g. by screening or centrifugal cleaning. Stickies, which have particle size less than about 150 μm are called microstickies and they are also a potential source for agglomeration, deposits, web breaks and dirt build-up, especially at process points where there occur abrupt changes e.g. in pH, temperature, conductivity, charge or the like. Microstickies are not easily removed mechanically from the pulp. Flotation or washing stages at deinking may remove some of the microstickies, but the processes are optimised for ink removal, which reduces their efficiency for removal of microstickies. Removal of microstickies is not efficient at thickening stage either, because they typically follow fibres and fines, and are not separated to a filtrate that could be treated with dissolved air flotation.

Pulps used for paper and board making also normally contain hydrophobic dissolved and colloidal substances. These substances have a tendency to stay in the process waters, but they may agglomerate into bigger hydrophobic particles, which are capable of forming deposits.

Hydrophobic substances, which have not been removed in deinking or other recycled fibre processing stage, and which are not trapped by the screens, enter the paper or board machine and circulate in the process waters. Due to the increased environmental awareness and regulations, papermaking processes have become more and more closed and use less fresh water. This results in heavy accumulation of interfering substances, including hydrophobic substances, in the fibre suspension and process waters.

The circulating hydrophobic substances may be controlled by adding chemicals to the papermaking process in order to build a boundary layer of hydrophilic material around hydrophobic particles to decrease their tendency to deposit, i.e. to make them less tacky. The colloidal stability of small hydrophobic particles may be enhanced by surfactants and dispersants, which prevent their agglomeration and deposition on the surfaces. Stickies, both micro- and macrostickies, tend to have a particle size, which is too large for effective stabilisation with surfactants.

Cationic high charged polymers such as homopolymers of diallyldimethylammonium chloride (DADMAC) are conventionally used as fixatives to control hydrophobic substances, such as pitch and stickies, through fixation. Nonionic polymers, such as polyvinyl alcohol, and copolymers, such as polyacrylamide-vinyl acetate, have been used for stickies control through detackification. Alum, starches and low molecular weight cationic coagulants are used conventionally for deposit control, as they can neutralize anionic trash and detrimental substances including pitch and stickies at least partly by complex formation. However, it has been observed that these complexes may become concentrated in the process and lead to further deposition problems. Thus, there is a continuous need for improved control of hydrophobic substances and effective control and prevention of deposit formation in paper and board making.

An object of this invention is to minimise or possibly even eliminate the disadvantages existing in the prior art.

Another object of the present invention is to provide an effective control of deposit formation caused by hydrophobic substances in manufacture of paper or board.

A further object of the present invention is especially to improve the fixation of the hydrophobic substances onto the fibres.

These objects are attained with the invention having the characteristics presented below in the characterising parts of the independent claims. Some preferred embodiments of the invention are presented in the dependent claims.

The features recited in the dependent claims and the embodiments in the description are mutually freely combinable unless otherwise explicitly stated.

The exemplary embodiments presented in this text and their advantages relate by applicable parts to the use, process as well as to the paper or board according to the invention, even though this is not always separately mentioned.

A typical use according to the present invention of a water-soluble polymer product comprising amphoteric polyacrylamide, which has neutral or cationic net charge at pH 7, a weight-average molecular weight of 2,500,000-18,000,000 g/mol and a total ionicity of 4-28 mol-%, is for controlling deposit formation caused by hydrophobic substances in manufacture of paper or board, where a fibre web is formed from an aqueous suspension of fibres.

In a typical papermaking process according to the present invention in manufacture of paper or board, where a fibre web is formed from an aqueous suspension of fibres, the method comprises:
providing an aqueous fibre suspension;
optionally diluting the aqueous fibre suspension;
delivering the aqueous fibre suspension to a headbox, draining the aqueous fibre suspension on a wire screen to form a wet web of paper or paperboard, and
pressing and drying the wet web to obtain a web of paper or board;
wherein a water-soluble polymer product comprising amphoteric polyacrylamide, which has a neutral or cationic net charge at pH 7, a weight-average molecular weight of 2,500,000-18,000,000 g/mol and a total ionicity of 4-28 mol-%, is added to the fibre suspension for controlling deposit formation caused by hydrophobic substances. Preferably the polymer product is dissolved in or diluted with water to obtain the aqueous treatment solution, prior to addition to the fibre suspension.

A typical paper or board according to the present invention is obtained by the inventive process or by the inventive use of a water-soluble amphoteric polymer.

Now it has been surprisingly found out that the water-soluble polymer product, which comprises a specified amphoteric polyacrylamide, is effective in deposit formation control. It is assumed that the said amphoteric polyacrylamide successfully fixes, i.e. attaches or associates, the hydrophobic substances onto the fibres and thus to the paper or board web, thereby reducing their accumulation and deposition in the process surfaces and/or waters. The total ionicity, and especially cationicity, of the amphoteric polyacrylamide is low, whereby the risk of overcationisation of the paper or board making process is reduced. Further, the presence of at least local cationic charge(s) in the polyacrylamide's amphoteric structure provides affinity to anionically charged polymers, such as acrylate, which are commonly present in stickies, while the local anionic charges in the amphoteric polyacrylamide structure may form ionic bonds with calcium ions often present in agglomerated stickies and/or pitch.

It was also unexpectedly observed that when an amphoteric polyacrylamide having a higher molecular weight than a conventional deposit control agent is used for deposit control, the amphoteric polyacrylamide is capable of fixing onto the fibres hydrophobic substances having widely variable particle size, from microstickies to agglomerated colloids and even macrostickies. This ability to fix also hydrophobic substances with increased particle size provides a clear advantage. Typically it has been relied on that the hydrophobic particles with increased particle size, such as macrostickies, are removed by screening of the fibre suspension or the recycled fibre material fraction. However, the small hydrophobic substances, such as microstickies and colloid hydrophobes, may increase their size during the papermaking process by agglomeration, whereby hydrophobes having of particle size of more than 100 microns or even more than 150 microns may exist in the fibre suspension even after the screening.

The present invention is especially efficient in controlling deposit formation of hydrophobic substances having particle size of 1-150 microns, such as 3-100 microns, especially by fixing them onto the fibres. This is a benefit over the conventional fixatives such as cationic inorganic fixatives or high cationic low molecular weight organic polymers, such as polyepiamine or polydiallyldimethyl-ammonium chloride (poly-DADMAC), that are capable of controlling deposit formation of hydrophobic substances having particle size of 1-3 microns, but that are not, at least efficiently, capable of fixing hydrophobic particles of bigger size onto the fibres.

It has been surprisingly found that the use according to the invention of the polymer product comprising amphoteric polymer is efficient in fixation of both microstickies having a particle size of 3-150 μm and, at the same time, hydrophobic particles such as pitch or colloidal stickies having a particle size of 0.2-3 μm. This realisation is advantageous in controlling and preventing depositions caused by agglomeration of hydrophobic substances in water loops and in approach system of a paper or board machine. The invention helps also to retain hydrophobic substances, such as stickies, to the paper web together with fibres with improved efficiency. The improved retention of hydrophobic substances reduces their agglomeration in white water.

The terms "hydrophobes" or "hydrophobic substances" are in the present context fully interchangeable and synonymous and they are used herein to encompass all hydrophobic interfering substances present in papermaking, potentially causing deposits, including stickies and pitch. The term "stickies" means synthetic hydrophobes originating e.g. from adhesives, such as pressure sensitive adhesives, hot-melt adhesives, dispersion adhesives, and solvent adhesives, including styrene butadiene rubber (SBR), ethylene vinyl and polyvinyl acetate, polyvinyl acrylate, polyethylene, polyisoprene, polyisobutene, polybutadiene, polyamide, polyurethane, polyvinyl alcohol, polyvinyl propionate, polyvinyl ether, polyester, acrylic acid ester, block copolymers, wax, natural or modified resins; printing inks, such as absorbing, oxidizing, radiation curing printing inks and xenographic toners, including mineral oil, wax, hydrocarbon and alkyd resins, rosin esters, unsaturated fatty acids, epoxy, polyol, urethane, polyester, polyvinyl and styrene acrylates, polyester and hydroxyl polyester, SBR and polyvinyl butyral; coating binders, such as latex, including SBR, and polyvinyl acetates and acrylates; waxes used in cartons for packaging; and hydrophobic internal and surface sizing agents. The term "pitch" means natural hydrophobes and wood derivates, such as wood extractives, sterols, fatty acids, resin acids, fatty esters, including their salts and other forms thereof.

Hydrophobic substances may be categorized also by their size. As used herein the term "macrostickies" means hydrophobic particles having diameter of above 150 microns, usually mechanically removable e.g. by screens. The term "microstickies" means in the present context hydrophobic particles having diameter of 3-150 microns, typically not removable by screens. By dissolved and colloidal hydrophobes is meant hydrophobic substances that are dissolved or have a particle size of below 3 microns.

As used herein the concept "deposit formation control of hydrophobic substances" means prevention or reduction of deposit formation caused by the hydrophobic substances in a paper or board making process by their removal from the fibre suspension, and especially by their removal by fixation onto the fibres. In the present context the terms "fixation", "fixing" and "fix" means that the hydrophobic substances are associated or attached onto the fibres at least temporarily or permanently.

In the context of the present application the term "amphoteric polyacrylamide" denotes a polyacrylamide where both cationic and anionic groups are present in an aqueous solution at pH 7. Amphoteric polyacrylamide is obtained by copolymerisation of acrylamide or methacrylamide together with both anionic and cationic monomers. Preferably amphoteric polyacrylamide is obtained by copolymerisation of acrylamide together with both anionic and cationic monomers.

The term "water-soluble" is understood in the context of the present application that the polymer product, and consequently the amphoteric polyacrylamide, is fully miscible with water. When mixed with excess of water, the amphoteric polyacrylamide in the polymer product is preferably fully dissolved and the obtained polymer solution is preferably essentially free from discrete polymer particles or granules. Excess of water means that the obtained polymer solution is not a saturated solution.

The amphoteric polyacrylamide has neutral or cationic net charge at pH 7. This means that at pH 7 the charges of the anionic and cationic charged groups present in the polyacrylamide cancel out each other, whereby the amphoteric polyacrylamide has a neutral net charge. Alternatively, the amphoteric polyacrylamide has more cationic charges than anionic charges at pH 7, whereby the amphoteric polyacrylamide has a cationic net charge. According to one embodiment 50-95%, preferably 60-90%, more preferably 70-85%, of the charged groups in the amphoteric polyacrylamide are cationic. It is preferred to have more cationically than anionically charged groups for improving the interaction of the amphoteric polyacrylamide with the fibres, and thereby the fixation of the hydrophobic substances. Thus, according to one preferable embodiment the amphoteric polyacrylamide has a net cationic charge as measured at pH 7. This means that the net charge of the amphoteric polyacrylamide remains positive, even if it contains anionic groups. The net charge of the amphoteric polyacrylamide is calculated as the sum of the charges of the cationic and anionic groups present.

According to one embodiment the amphoteric polyacrylamide in the polymer product comprises 3-25 mol-%, preferably 5-14 mol-%, more preferably 5-9 mol-%, of structural units derived from cationic monomers. According to one embodiment the amphoteric polyacrylamide in the polymer product comprises 0.5-5 mol-%, preferably 1-4 mol-%, more preferably 1-2.5 mol-%, of structural units derived from anionic monomers.

The amphoteric polyacrylamide has a weight-average molecular weight of 2,500,000-18,000,000 g/mol. When the amphoteric polyacrylamide is prepared by gel polymerisation process the weight-average molecular weight of the polyacrylamide may preferably be 4,000,000-18,000,000 g/mol. According to one preferable embodiment the amphoteric polyacrylamide has the weight-average molecular weight in the range of 3,000,000-18,000,000 g/mol, preferably 3,500,000-11,000,000 g/mol, more preferably 4,000,000-8,000,000 g/mol, even more preferably 4,000,000-6,000,000 g/mol. The molecular weight of the amphoteric polyacrylamide has a major impact on its behaviour and performance. It has been observed that when the weight-average molecular weight of the amphoteric polyacrylamide is 2,500,000 g/mol or more there is improved fixing, even of bigger hydrophobic particles, to the fibres. It has also been observed that when the weight-average molecular weight is at most 18,000,000 g/mol, the fibres are more evenly spaced, there is reduced risk of over-flocculation, so the formation of the web is not disturbed, even with higher polymer dosages. This may be also due to the optimal presence of both anionic and cationic charges, so amphoteric polymers are capable of forming loops in papermaking fibre suspension, especially in neutral papermaking pH, thereby preventing too extensive flocculation that could spoil the formation of the formed web.

The amphoteric polyacrylamide may have an intrinsic viscosity in the range of 6.7-27 dl/g, which approximately corresponds a weight-average molecular weight of 2,500,000-18,000,000 g/mol. According to one preferred embodiment the intrinsic viscosity of the amphoteric polyacrylamide may be in the range of 7.5-27 dl/g, preferably 8.5-19 dl/g, more preferably 9.3-15.2 dl/g, even more preferably 9.3-12.5 dl/g. The intrinsic viscosities reflect the molecule size and may be calculated into weight-average molecular weights as explained hereinafter.

The value "weight-average molecular weight" is in the present context used to describe the magnitude of the polymer chain length. Weight-average molecular weight values are preferably calculated from intrinsic viscosity results measured in a known manner in 1N NaCl at 25° C. by using an Ubbelohde capillary viscometer. The capillary selected is appropriate, and in the measurements of this application an Ubbelohde capillary viscometer with constant K=0.005228 was used. The average molecular weight is then calculated from intrinsic viscosity result in a known manner using Mark-Houwink equation $[\eta]=K \cdot M^a$, where $[\eta]$ is intrinsic viscosity, M molecular weight (g/mol), and K and a are parameters given in Polymer Handbook, Fourth Edition, Volume 2, Editors: J. Brandrup, E. H. Immergut and E. A. Grulke, John Wiley & Sons, Inc., USA, 1999, p. VII/11 for poly(acrylamide). Accordingly, value of parameter K is 0.0191 ml/g and value of parameter "a" is 0.71. The average molecular weight range given for the parameters in used conditions is 490,000-3,200,000 g/mol, but the same parameters are used to describe the magnitude of molecular weight also outside this range. pH of the polymer solutions for intrinsic viscosity determination is adjusted to 2.7 by formic acid to avoid probable poly-ion complexation of amphoteric polyacrylamides.

The amphoteric polyacrylamide may have a total ionicity of 4-28 mol-%. According to one preferable embodiment the total ionicity of the amphoteric polyacrylamide is in the range of 4-18 mol-%, preferably 5-13 mol-%, more preferably 6-12 mol-%, even more preferably 6-10 mol-%. The amphoteric polyacrylamide in the polymer product may comprise at least 72 mol-%, preferably at least 82 mol-% structural units derived from acrylamide and/or methacrylamide monomers, and at most 28 mol-%, preferably at most 18 mol-% of structural units originating from anionic and cationic monomers. Total ionicity includes all groups having ionic charge in the amphoteric polyacrylamide, at pH 7, most of the charged groups originating from the ionic monomer units, but including also other charged groups originating from chain termination agents or the like. It has been observed that it is beneficial when the total ionicity of the polymer is at most 18 mol-%, especially when the weight-average molecular weight of the polymer is 2,500,000-18,000,000 g/mol, or preferably 3,500,000-11,000,000 g/mol. Higher ionicity, especially cationicity, could cause overcationisation when the polymer product is used in increased dosages. Thus the relatively low ionicity of the amphoteric polyacrylamide enables the use of increased polymer product dosages to fibre suspensions, even if the pulp has a zeta potential values close to zero. The ionicity of the amphoteric polyacrylamide can be optimised in view of avoiding the zeta potential problems in the stock, i.e. shifting of the zeta potential of the pulp to positive values.

According to one preferable embodiment the amphoteric polyacrylamide is a linear polyacrylamide. In other words, the amphoteric polyacrylamide is unbranched and preferably not crosslinked. In the polymerisation the amount of cross-linker is less than 0.002 mol-%, preferably less than 0.0005 mol-%, more preferably less than 0.0001 mol-%. According to one embodiment the polymerisation is completely free of cross-linker. The linear amphoteric polyacrylamide reduces effectively the possibility for insoluble polymer particles, which could reduce the quality of the produced paper or board.

According to one embodiment the cationic groups in the amphoteric polyacrylamide originate from monomers selected from 2-(dimethylamino)ethyl acrylate (ADAM), [2-(acryloyloxy)ethyl]trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl]trimethylammonium chloride (MADAM-Cl), 2-di methylaminoethyl methacrylate di methylsulphate, [3-(acryloylamino)propyl]trimethylammonium chloride (APTAC), [3-(methacryloylamino)propyl]trimethylammonium chloride (MAPTAC) and diallyldimethylammonium chloride (DADMAC). Quaternary amines are preferred cationic monomers because their charge is not pH dependent. More preferably the cationic monomer is [2-(acryloyloxy) ethyl]trimethylammonium chloride (ADAM-Cl).

According to one embodiment the anionic groups in the amphoteric polyacrylamide originate from monomers selected from unsaturated mono- or dicarboxylic acids, such as acrylic acid, maleic acid, fumaric acid, itaconic acid, aconitic acid, mesaconic acid, citraconic acid, crotonic acid, isocrotonic acid, angelic acid or tiglic acid.

The amphoteric polyacrylamide of the polymer product may be obtained by free radical polymerisation by using any suitable polymerisation method, such as solution polymerisation; dispersion polymerisation e.g. in the presence of inorganic salt(s) and/or organic polyelectrolyte(s); emulsion polymerisation, especially inverse-emulsion polymerization; or gel polymerisation, producing a water-soluble polyacrylamide with molecular weight within the specified range. The thus obtained polymer product may be for example in the form of an aqueous solution, aqueous dispersion, emulsion, or dry particulate polymer product. Emulsion polymerisation, such as inverse-emulsion polymerisation, and gel polymerisation, may achieve polymer products with higher polymer content, such as at least 25 weight-%, as well as polymers having any of the molecular weights within the whole specified molecular weight range.

According to one embodiment the amphoteric polyacrylamide of the polymer product may preferably be obtained by gel polymerisation. According to one embodiment, this preparation process may use a reaction mixture comprising non-ionic monomers, such as acrylamide, and the charged anionic and cationic monomers. The monomers in the reaction mixture are polymerised in presence of initiator(s) by using free radical polymerisation. The temperature in the beginning of the polymerisation may be less than 40° C., sometimes less than 30° C. Sometimes the temperature in the beginning of the polymerisation may be even less than 5° C. The free radical polymerisation of the reaction mixture produces amphoteric polyacrylamide, which is in gel form or highly viscous liquid. After the gel polymerisation, the obtained amphoteric polyacrylamide in gel form is comminuted, such as shredded or chopped, as well as dried, whereby a particulate polymer product is obtained. Depending on the used reaction apparatus, shredding or chopping may be performed in the same reaction apparatus where the polymerisation takes place. For example, polymerisation may be performed in a first zone of a screw mixer, and the shredding of the obtained polymer is performed in a second zone of the said screw mixer. It is also possible that the shredding, chopping or other particle size adjustment is performed in a treatment apparatus, which is separate from the reaction apparatus. For example, the obtained hydrosoluble, i.e. water-soluble, polymer may be transferred from the second end of a reaction apparatus, which is a belt conveyor, through a rotating hole screen or the like, where it is shredded or chopped into small particles. After shredding or chopping the comminuted polymer is dried, milled to a desired particle size and packed for storage and/or transport.

According to one embodiment of the invention the amphoteric polyacrylamide is obtained by gel polymerisation process, where the content of monomers in the reaction mixture at the start of the polymerisation is at least 29 weight-%, preferably at least 30 weight-%, more preferably at least 32 weight-%.

According to one embodiment the polymer product has a polymer content of at least 25 weight-%, preferably at least 60 weight-%. A polymer product having lower polymer content, e.g. obtained by solution polymerisation, has the advantage of easier dilution or dissolution to the concentration of use. A polymer product having a high polymer content, e.g. obtained by gel polymerisation, is more cost efficient in view of the logistics of the product. A high polymer content has the additional benefit of improved microbial stability. For example, when the polymer content of the polymer product is at least 60 weight-%, which is typical for a polymer product obtained by gel polymerisation, microbial activity is reduced, and the polymer product is more stable even in warm climate and for long storage periods.

According to one preferable embodiment of the invention the amphoteric polyacrylamide content in the polymer product is in the range of 60-98 weight-%, preferably 70-98 weight-%, more preferably 75-95 weight-%, even more preferably 80-95 weight-%, sometimes even more preferably 85-93 weight-%. Because the amphoteric polyacrylamide content of the polymer product is high, naturally the amount of active amphoteric polyacrylamide is also high. This has a positive impact on transport and storage costs of the polymer product. Moisture content of the polymer product is typically 5-12 weight-%.

According to one preferable embodiment the polymer product comprising amphoteric polyacrylamide is in particle form. In the context of the present application the term "particle form" denotes discrete solid particles or granules. According to one embodiment of the invention the polymer product comprises particles or granules of amphoteric polyacrylamide, which have an average particle size of <2.5 mm, preferably <2.0 mm, more preferably <1.5 mm. These particles are obtained by subjecting the amphoteric polyacrylamide obtained by gel polymerisation to mechanical comminution, such as cutting, milling, shredding, chopping or the like.

According to one embodiment of the present invention the solids content of the polymer product in particle form may be >80 weight-%, preferably >85 weight-%, more preferably in the range of 80-97 weight-%, even more preferably 85-95 weight-%. The high solids content is beneficial in view of storage and transport properties of the polymer product.

When used, the water-soluble polymer product comprising the amphoteric polyacrylamide is usually dissolved into water and/or diluted, whereby an aqueous treatment solution is obtained. The polymer content of the said aqueous treatment solution may be 0.1-4 weight-%, preferably 0.3-3 weight-%, more preferably 0.5-2 weight-%. According to one embodiment the water-soluble polymer product comprising amphoteric polyacrylamide is dissolved in or diluted with water having pH 2.5-5 to obtain the aqueous treatment solution. The suitable pH may be adjusted e.g. by adding an acid, or base. Using this slightly acidic pH in polymer dissolution the polymer maintains its full functionality.

According to one preferable embodiment of the invention the polymer product comprising amphoteric polyacrylamide is used for controlling deposit formation caused by hydrophobic substances in manufacture of paper or board, where a fibre web is formed from an aqueous suspension of fibres, which comprises recycled fibre material. According to one embodiment the fibre suspension comprises at least 50 weight-%, preferably at least 60 weight-%, more preferably at least 70 weight-%, of recycled fibre material, based on dry paper or paperboard. In some embodiments the fibre suspension may comprise even >80 weight-%, or 100 weight-%, of fibres originating from recycled fibre materials. According to one preferable embodiment the recycled fibre material may be selected from old corrugated containerboard, mixed office waste, old newsprint, old magazines, double liner kraft, and any mixtures thereof. According to one preferable embodiment the recycled fibre material may be selected from old corrugated containerboard or mixed waste or old newsprint without deinking stage. Old corrugated containerboard (OCC) denotes recycled fibre material comprising corrugated containers, which have liners of test liner, jute or kraft, and the term may cover also double sorted corrugated containerboard (DS OCC). Mixed waste (MXW) denotes recycled mixture of recycled board, such as OCC, white lined chipboard and/or folding boxboard, and recycled paper, such as old newsprint, old magazines and/or office waste papers. Mixed office waste (MOW) denotes recycled fibre material mainly containing copying papers, printer papers and offset papers. Double lined kraft denotes recycled fibre material comprising clean sorted unprinted corrugated cardboard cartons, boxes, sheet or trimmings, e.g. of kraft or jute liner. White lined chipboard (WLC) denotes multiply board comprising deinked fibre material and/or undeinked recycled fibre material originating e.g. from OCC, mixed office waste or old newspapers (ONP) in or more of the layers. Presence of any of these recycled fibre materials in the fibre suspension usually decreases drainage and paper strength, and provides a substantial load of hydrophobic dissolved and colloidal substances to the process. Processes employing recycled fibres and having an elevated load of hydrophobic substances in the fibre suspension benefit especially from the polymer product use according to the present invention. It has been observed that not only the formation of the deposits is reduced but also the interference of the hydrophobes with conventional cationic retention agents, dry strength agents and wet strength agents is diminished. Washing of the process surfaces, such as wires and felts, may be reduced.

According to one embodiment the fibre suspension has a conductivity of at least 1.5 mS/cm, preferably at least 2.0 mS/cm, more preferably at least 3.0 mS/cm, measured at the headbox of the paper or board machine. Elevated conductivity is typical for fibre suspension comprising recycled fibres and/or closed papermaking process, having increased load of hydrophobic substances. The polymer product comprising amphoteric polyacrylamide can be used even at elevated conductivity, without significant decrease in effectivity in deposition control.

According to one preferred embodiment of invention the fibre suspension comprises recycled fibre material, which comprises more than 0.02 mg/g, preferably more than 0.2 mg/g, of hydrophobic substances having particle size in the range of 10-150 μm, calculated on basis of recycled fibre material as dry, of recycled fibre material as dry. The amount of hydrophobic particles is measured by using the extraction method described in the experimental section of this application. Especially, recycled fibre material which is processed without flotation and/or washing stages benefits from the use according to the present invention employing polymer product comprising amphoteric polyacrylamide.

According to one embodiment of the invention the fibre suspension comprises fibres obtained by kraft and/or mechanical pulping process(es). When the fibre suspension comprises fibres from kraft and/or mechanical pulping, the amount of pitch in the process may be elevated. The use according to the invention provides also improved control of deposit formation due to pitch.

The aqueous treatment solution of the polymer product comprising amphoteric polyacrylamide may be added to the fibre suspension, preferably to the thick stock, as a wet end chemical. Thick stock is here understood as a fibrous stock or furnish, which has consistency of above 20 g/l, preferably more than 25 g/l, more preferably more than 30 g/l. According to one embodiment the amphoteric polyacrylamide is added to fibre suspension having consistency of above 20 g/l. According to one embodiment, the addition of the treatment solution is located after the stock storage towers, but before thick stock is diluted in the wire pit (off-machine silo) with short loop white water. Preferably the amphoteric polyacrylamide is added to the fibre suspension before a machine chest, more preferably before a mixing chest, of a paper or board machine. In this way the amphoteric polyacrylamide has more time to interact with the hydrophobic substances and fix them onto the fibres. When recycled fibres are used the polymer product comprising amphoteric polymer is preferably added to the stock component comprising recycled fibres before it is mixed with optional other stock components, such as broke, kraft pulp or mechanical pulp. On the other hand, due to the presence of anionic charges in its structure the amphoteric polyacrylamide is capable of reflocculating if the polymer is cut or deformed due to shear forces caused by the subsequent units, such as pumps, cleaners, or screens.

According to one embodiment the polymer product is used in such amount that the amount of the amphoteric polyacrylamide is 100-2000 g/ton produced paper or board, preferably in the range of 300-1500 g/ton produced paper or board, more preferably in the range of 400-900 g/ton produced paper or board. According to one preferred embodiment the amount of the amphoteric polyacrylamide added before a machine chest, more preferably before a mixing chest, is 100-2000 g/ton, preferably in the range of 300-1500 g/ton, more preferably in the range of 400-900 g/ton produced paper or board.

According to one embodiment the inorganic microparticles, preferably bentonite microparticles, are further added to the fibre suspension. The interaction of the microparticles and the polymer product comprising amphoteric polyacrylamide provides additional benefits in further control of deposit formation of hydrophobic substances. The inorganic microparticles may be added to the fibre suspension before a machine chest, more preferably before a mixing chest, of a paper or board machine. According to one preferable embodiment the polymer product comprising amphoteric polyacrylamide is added to the fibre suspension before the addition of the inorganic microparticles. The addition of the polymer product and the microparticles may be done to the thick stock or thin stock, or the polymer product may be added to the thick stock, followed by the addition of the microparticles to the thin stock. Preferably both the polymer product comprising amphoteric polyacrylamide and the inorganic microparticles are added to the thick stock. According to one preferable embodiment, the addition of the polymer product and the microparticles is followed by addition of one or more retention agents, such as high molecular weight polyacrylamide, having a molecular weight of >500,000 Da. Thin stock denotes here a fibre suspension having consistency <20 g/l.

In the present context, and as used above, the term "fibre suspension" is understood as an aqueous suspension, which comprises fibres, preferably recycled fibres, and optionally fillers. The water-soluble polymer product comprising amphoteric polyacrylamide is especially suitable for manufacture of paper and/or board grades having an ash content before coating, if any, of >10%, preferably >15%, more preferably >20%. Standard ISO 1762, temperature 525° C. is used for ash content measurements. For example, the fibre suspension may comprise at least 5%, preferably 10-30%, more preferably 11-19% of mineral filler. The amount of mineral filler is calculated by drying the fibre suspension, and the ash content is measured by using standard ISO 1762, at temperature 525° C. Mineral filler may be any filler conventionally used in paper and board making, such as ground calcium carbonate, precipitated calcium carbonate, clay, talc, gypsum, titanium dioxide, synthetic silicate, aluminium trihydrate, barium sulphate, magnesium oxide or their any of mixtures.

According to one preferable embodiment polymer product comprising amphoteric polyacrylamide is used for controlling deposit formation caused by hydrophobic substances in manufacture of board when produced paperboard is selected from liner, fluting, gypsum board liner, core board, folding boxboard (FBB), white lined chipboard (WLC), solid bleached sulphate (SBS) board, solid unbleached sulphate (SUS) board or liquid packaging board (LPB). Boards may have grammage from 120 to 500 g/m$^2$ and they may be based 100% on primary fibres, 100% on recycled fibres, or to any possible blend between the primary fibres and the recycled fibres.

The water-soluble polymer product comprising amphoteric polyacrylamide is especially suitable for controlling deposit formation caused by hydrophobic substances in a thick stock having a zeta-potential value −35−−1 mV, preferably −10−−1, more preferably −7−−1 mV, measured with Mütek SZP-06 device, as measured just before the addition of the water-soluble polymer product comprising amphoteric polyacrylamide to the fibre suspension.

The polymer product according to the present invention may also show an additional benefit of maintaining or even improving dewatering results of the fibre suspension in the paper or board making process.

EXPERIMENTAL

Some embodiments of the invention are described in the following non-limiting examples.

The following methods were used to in the experiments for analysis:

Extraction Measurement Method for Determining the Amount of Hydrophobic Substances, e.g. Stickies Stickies are measured by taking a pulp sample and diluting it to 1% consistency. 500 ml of the pulp sample is screened in Dynamic Drainage Jar (DDJ) equipped with M80 wire in 25° C. temperature. DDJ is operated with 1200 rpm continuously. After 90% of the pulp sample is screened, 500 ml of washing water is added. Washing is repeated with additional 500 ml of water. DDJ is stopped, when 50 ml of pulp slurry is left on top of wire. Upper fraction remaining on wire and lower fraction screened through the wire are collected to filter paper by vacuum filtration with Bühner funnel. Munktell, Ahlström M00 drage 125 mm diameter filter papers are used. Filter papers with pulp are dried in oven, temperature 110° C., for 4 hours. Samples are weighted for dry weight determination. Filter papers are freeze dried and extracted with tetrahydrofurane. Gravimetric analysis followed by HPLC SEC measurement is conducted according to method presented at PhD Thesis of Tiina Sarja from Oulu University, Finland (Measurement, nature and removal of stickies in deinked pulp, Acta Universitatis Ouluensis, C Technica 275, Oulu University Press, 2007). Sticky extractives from the upper fraction is considered to represent macrostickies, having particle size >150 µm, and from the lower fraction microstickies, having particle size 10-150 µm. The results are calculated per total dry weight of fibre sample.

Flow Cytometry Method 10 ml of pulp sample, where fixing chemical has been added, is mixed with 40 ml of distilled water. Sample is filtered to separate long fibres, which would otherwise disturb the measurement. Filtrate is diluted with distilled water and fluorescent colouring agent is added. Flow cytometric measurement is done with SL Blue device supplied by Partec GmbH. Colouring agent amount is tested so that the particles are distinguished based on fluorescence signal. Size of the particles is analysed by side scattering, which is calibrated by using standard size spherical polystyrene particles. 1 ml sample tube is used in flow cytometer of which 200 µl is analysed. Each particle is characterized by fluorescence intensity and by size. Hydrophobic population of stickies or pitch detected by higher fluorescence intensity is separated with gating from other particles including fines and pigments. Sample with at least 80% less stickies and pitch results in about 80% lower amount of particles in hydrophobic population gate. The separated hydrophobic population has size from 0.2 µm to 20 µm. The results from this hydrophobic population are calculated as number of particles, as average size of particles, as size distribution of particles or as area or volume of particles by assuming the shape as spherical.

Other Measurement Methods for Pulp Samples

For turbidity test 30 ml of pulp sample was filtered through black-ribbon filter paper in gravity filtration funnel and the filtrate was saved for measurements. Turbidity was measured immediately from the filtrate.

Measurement devices and/or standards used in characterisation of pulp/filtrate properties are given in Table 1.

TABLE 1

Measurement devices and/or standards used in Example 1.

| Property | Device/Standard |
|---|---|
| pH | Knick Portamess 911 |
| Turbidity (NTU) | WTW Turb 555IR |
| Conductivity (mS/cm) | Knick Portamess 911 |
| Charge (µekv/l) | Mütek PCD 03 |
| Zeta potential (mV) | Mütek SZP-06 |
| Consistency (g/l) | ISO 4119 |

General Description of the Polymer Product Preparation

Preparation of Monomer Solution for the Amphoteric Polyacrylamide

Monomer solution is prepared by mixing 248.3 g of 50% acrylamide solution, 0.01 g of 40% DTPA Na-salt solution, 2.9 g of sodium gluconate, 4.4 g of dipropylene glycol, 1.9 g of adipic acid, and 7.2 g of citric acid in a temperature controlled laboratory glass reactor at 20-25° C. The mixture is stirred until solid substances are dissolved. To the solution is added 32.6 g of 80% ADAM-Cl. pH of the solution is adjusted to 3.0 with citric acid, and 2.8 g of acrylic acid is added to the solution. pH is adjusted to be 2.5-3.0.

Preparation of Dry Polymer Product

After the monomer solution is prepared according to the description, the monomer solution is purged with nitrogen flow in order to remove oxygen. An initiator is added to the monomer solution. The initiator solution is 4 ml of 6% 2-hydroxy-2-methylpropiophenone in polyethylene glycol-water (1:1 by weight) solution. The monomer solution is placed on a tray to form a layer of about 1 cm under UV-light. UV-light is mainly on the range 350-400 nm, for example light tubes Philips Actinic BL TL 40 W can be used. Intensity of the light is increased as the polymerisation proceeds to complete the polymerisation. The first 10 minutes the light intensity is 550 µW/cm$^2$, and following 30 minutes it is 2000 µW/cm$^2$. The obtained gel is run through an extruder and dried to moisture content less than 10% at temperature of 60° C. The dried polymer is ground and sieved to particle size 0.5-1.0 mm.

Intrinsic viscosity of the polymer product was determined by Ubbelohde capillary viscometer in 1 M NaCl at 25° C. Polymer product was dissolved in 1 M NaCl and a series of dilutions at suitable concentrations ranging from 0.01 to 0.5 g/dl for viscosity determinations. pH of the polymer solution for capillary viscosity determination was adjusted to 2.7 by formic acid to avoid impact of probable poly-ion complexation for viscosity. Molecular weights were calculated using "K" and "a" parameters of polyacrylamide. The value of parameter "K" is 0.0191 ml/g and the value of parameter "a" is 0.71. Determined intrinsic viscosity was 9.9 dl/g and calculated molecular weight 4,400,000 g/mol.

Chemicals Used in the Examples

Chemicals used in the examples are given in Table 2.

TABLE 2

Chemicals used in the examples.

| Chemical | Dissolving conc. % | Dosing conc. % | Description |
|---|---|---|---|
| CPAM | 0.5 | 0.02 | cationic copolymer of 10 mol-% ADAM-Cl and 90 mol-% acrylamide Molecular weight 6 Mg/mol |
| AMF | 0.5 (at pH 3.5) | 0.02 | amphoteric copolymer of 7 mol-% ADAM-Cl, 2 mol-% acrylic acid and 91 mol-% acrylamide, manufactured as described above Molecular weight 4.4 Mg/mol |
| PA | 0.5 | 0.02 | Polyamine Molecular weight 250 000 g/mol |
| PVOH | 4 | 0.2 | Copolymer of 88 mol-% vinylalcohol and 12 mol-% vinyl acetate Brookfield viscosity 50 mPas at 4% concentration. |
| BENT | 2 | 0.2 | bentonite, Altonite SF, Kemira Oyj |
| DISP | 1 | 0.05 | anionic dispersing agent, FennoDispo 320, Kemira Oyj |
| PAC | N/A | 1 (used in 15 s) | polyaluminiumchloride, FennoFloc A100, Kemira Oyj |

Example 1: Fixation Test

Used Pulps

Recycled fibre pulp containing European old corrugated containerboard, OCC, diluted to 2% consistency with board machine clear filtrate.

Kraft pulp was unbleached spruce pulp, diluted to 2% consistency with board machine clear filtrate.

Measured properties for pulps and filtrate are given in Table 3.

TABLE 3

Results from measurements of pulp properties.

| Property | Recycled Pulp | Kraft Pulp | Clear Filtrate |
|---|---|---|---|
| pH | 7.8 | 8.16 | 6.24 |
| Turbidity, NTU | 346 | 72 | 14 |
| Conductivity, mS/cm | 2.29 | 1.11 | 0.94 |
| Charge, μekv/l | −139 | −684 | −99 |
| Consistency, g/l | 83.0 | 73.8 | 0 |
| Ash content, % | 8.21 | | |
| Macrostickies, size >150 μm, mg/g | 0.30 | | |
| Microstickies, size 10-150 μm, mg/g | 0.47 | | |

In measurements pulp samples were heated to temperature of 50° C. Pulp sample and added chemical were mixed in 500 ml beaker by blade stirrer with 200 rpm for 2 min after chemical addition. When a dispersing agent was used it was first added to the sample and the sample then mixed for 15 min before following chemical addition.

Flow cytometry sample was taken after mixing from the pulp sample.

Figure 2:
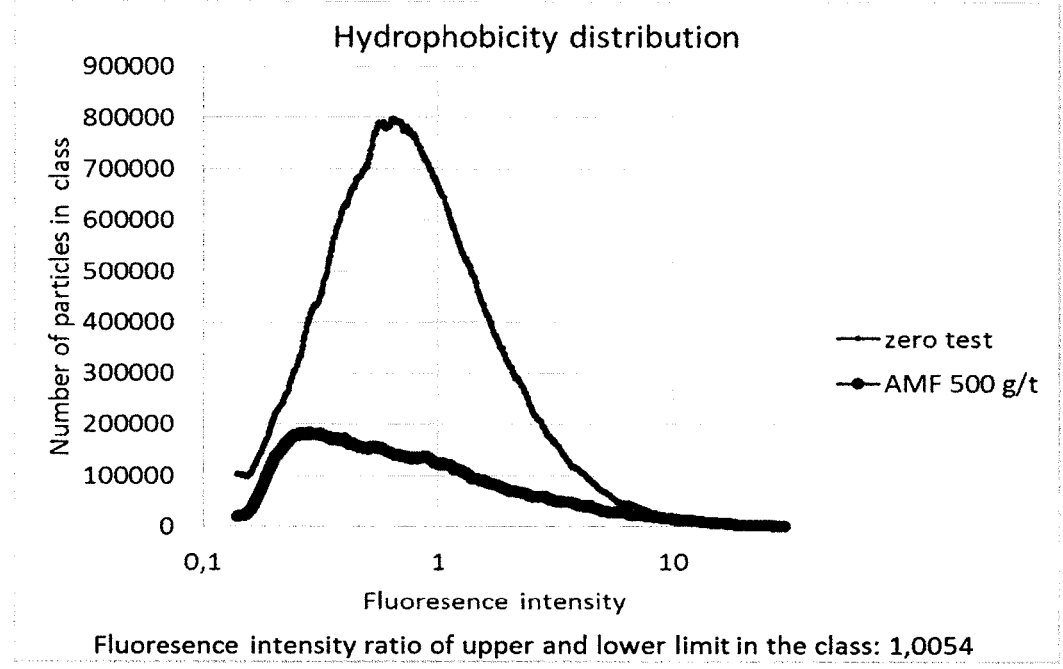

In Table 4 are presented the fixation test results measured by using flow cytometry method described above for recycled fibre pulp samples. It can be seen from the results that polymer product comprising amphoteric polyacrylamide (AMF) is most efficient in fixing colloidal particles, which cause turbidity, as well as hydrophobic particles in separate ranges of 0.2-3.0 μm and 3.0-20 μm. The obtained effect is excellent in both size categories simultaneously, whereas other fixation and passivation agents are effective only for low or high size range. Also total area and volume of hydrophobic material is reduced, which indicates reduced deposit formation risk in a paper machine. Particle size distributions of hydrophobic particles measured by flow cytometry for test #1 and test #6 are presented in FIG. 1. Results indicate that the fixation efficiency is good in wide particle size range. Hydrophobicity distributions for the same tests #1 and #6 are shown in FIG. 2. This illustrates that use of the polymer product comprising amphoteric polymer is efficient for particles with different hydrophobicity levels. This is beneficial for fixation of stickies, as the stickies may originate from various chemical substances and have widely variable hydrophobicity.

TABLE 4

Fixation and flow cytometry test results for recycled fibre pulp sample.

| | | | | Hydrophobic particles by flow cytometry | | | |
|---|---|---|---|---|---|---|---|
| # | Added Chemical | Dosage, g/t | Turbidity NTU | Count, 0.2-3.0 μm | Count 3.0-20 μm | Total area, $m^2/m^3$ | Total volume, $cm^3/m^3$ |
| 1 | — | 0 | 680 | 41847500 | 3047500 | 68.5 | 42.8 |
| 2 | CPAM | 150 | 238 | 16302500 | 3680000 | 73.4 | 60.8 |
| 3 | CPAM | 300 | 131 | 11812500 | 3483750 | 69.9 | 61.0 |
| 4 | AMF | 150 | 226 | 17816250 | 3997500 | 78.7 | 63.2 |
| 5 | AMF | 300 | 85 | 7053750 | 3007500 | 58.5 | 52.0 |
| 6 | AMF | 500 | 56 | 3548750 | 1657500 | 33.3 | 30.5 |
| 7 | PA | 125 | 360 | 27585000 | 2736250 | 57.6 | 37.2 |
| 8 | PA | 250 | 308 | 30453750 | 3726250 | 77.9 | 52.6 |
| 9 | PA | 500 | 87 | 22798750 | 4581250 | 87.6 | 62.3 |
| 10 | PVOH | 40 | 675 | 32902500 | 2781250 | 61.8 | 40.9 |
| 11 | PVOH | 80 | 697 | 34767500 | 2683750 | 60.8 | 39.9 |
| 12 | PVOH | 160 | 740 | 18983750 | 1716250 | 36.8 | 24.0 |
| 13 | BENT | 2000 | 315 | 37240000 | 4643750 | 96.0 | 62.8 |
| 14 | BENT | 4000 | 139 | 19156250 | 4681250 | 85.1 | 59.8 |
| 15 | DISP + PA | 300 500 | 391 | 33978750 | 3212500 | 68.7 | 43.6 |
| 16 | DISP + AMF | 300 500 | 111 | 3615000 | 1286250 | 26.9 | 24.4 |

In Table 5 are presented the fixation test results measured by using flow cytometry method described above for various test pulp samples, comprising kraft pulp or a mixture of kraft pulp and recycled pulp. Chemicals were added to pulps before or after mixing pulps together. Results in Table 5 show that addition of polyaluminum chloride and the polymer product comprising amphoteric polyacrylamide was fixing hydrophobic particles having size of 0.2-20 μm in kraft pulp. The results show also efficiency of the polymer product comprising amphoteric polyacrylamide when it was added to the recycled fibre pulp or to kraft pulp together with polyaluminum chloride before components were mixed together. This demonstrates the addition of the polymer product to stock components before the mixing chest. Clear benefit was observed in hydrophobic particles of 0.2-20 μm, in volume of these particles and in turbidity.

All chemical additions in Table 5 are given as kg active/ton dry pulp. Pulp samples were mixed for 5 min after a PAC addition and for 1 min after an AMF addition.

TABLE 5

Fixation test for various pulp samples

| # | Test pulp | Additions to kraft pulp component | Additions to recycled fibre pulp component | Hydrophobic particles by flow cytometry Count, 0.2-20 μm | Volume, cm³/m³ | Turbidity, NTU |
|---|---|---|---|---|---|---|
| 1 | Kraft 100% | | | 1567500 | 0.85266789 | 51 |
| 2 | Kraft 100% | 0.5 PAC 0.5 + 0.2 AMF | | 1203750 | 1.1005207 | 43 |
| 3 | Kraft 70% + RCF 30% | | | 21065000 | 21.9402782 | 525 |
| 4 | Kraft 70% + RCF 30% | 0.5 PAC + 0.2 AMF | 0.5 AMF | 4410000 | 15.2084352 | 95 |

Example 2

Used Pulp

Dried bleached birch pulp, wet disintegrated to 1.5% consistency.

Measured properties for pulps and filtrate are given in Table 6.

TABLE 6

Results from measurements of pulp properties.

| Measurement | Bleached kraft pulp |
|---|---|
| pH | 7.30 |
| Turbidity, NTU | 4 |
| Conductivity, μS/cm | 132.1 |
| Charge, μekv/l | −15 |
| Consistency, g/l | 15.1 |

Pulp was heated to 45° C. A 100 ml sample taken from pulp, chemical was added and mixed by shaking half-filled vessel for 15 s after chemical addition. When dispersing agent was used it was added first and then mixed for 15 min before following chemical addition. Flow cytometry sample was taken after mixing from the test sample. For turbidity test 30 ml of sample was filtered through black-ribbon filter paper in gravity filtration funnel.

Table 7 shows that polymer product comprising amphoteric polyacrylamide improves the fixation of hydrophobic particles both in 1-3 μm and in 3-20 μm size category, where polyamine (PA) is effective only at high dosage in 1-3 μm size category. Also total area and total volume of hydrophobic particles was reduced with use of the polymer product comprising amphoteric polyacrylamide.

TABLE 7

Fixation and flow cytometry test results for bleached kraft pulp.

| | | | Hydrophobic particles by flow cytometry | | | |
|---|---|---|---|---|---|---|
| # | Polymer | Dosage, g/t | Count, 1.0-3.0 μm | Count, 3.0-20 μm | Area, m²/m³ | Volume, cm³/m³ |
| 1 | — | 0 | 11500 | 550 | 0.015 | 0.012 |
| 2 | PA | 50 | 14250 | 650 | 0.016 | 0.010 |
| 3 | PA | 100 | 13300 | 750 | 0.016 | 0.011 |
| 4 | PA | 250 | 8000 | 800 | 0.019 | 0.016 |
| 5 | AMF | 100 | 6600 | 450 | 0.008 | 0.005 |
| 6 | AMF | 200 | 6400 | 250 | 0.007 | 0.004 |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method to control deposit formation caused by hydrophobic substances in a process for manufacture of paper or board, the method comprising:
   providing an aqueous fibre suspension;
   fixing in the aqueous fiber suspension microstickies having a particle size of 3-150 μm, and pitch or colloidal stickies having a particle size of 0.2-3 μm onto the fiber by adding into the aqueous fibre suspension before a mixing chest a water-soluble polymer product comprising amphoteric polyacrylamide having a neutral or cationic net charge at pH 7, a weight-average molecular weight of 2,500,000-18,000,000 g/mol and a total ionicity of 4-28 mol-%, the amphoteric polyacrylamide comprising 3-25 mol-% of structural units derived from cationic monomers, and 0.5-5 mol-% of structural units derived from anionic monomers;
   optionally diluting the aqueous fibre suspension;
   delivering the aqueous fibre suspension to a headbox, and draining the aqueous fibre suspension on a wire screen to form a wet web of the paper or the paperboard; and
   pressing and drying the wet web to obtain a web of the paper or the board.

2. The method according to claim 1, wherein the amphoteric polyacrylamide has a weight-average molecular weight in a range of 3,000,000-18,000,000 g/mol.

3. The method according to claim 1, wherein the total ionicity of the amphoteric polyacrylamide is in a range of 4-18 mol-%.

4. The method according to claim 1, wherein 50-95% of the charged groups in the amphoteric polyacrylamide are cationic.

5. The method according to claim 1, wherein the amphoteric polyacrylamide has a net cationic charge as measured at pH 7.

6. The method according to claim 1, wherein the amphoteric polyacrylamide is a linear polyacrylamide.

7. The method according to claim 1, wherein the cationic groups of the amphoteric polyacrylamide originate from monomers selected from 2-(dimethylamino)ethyl acrylate (ADAM), [2-(acryloyloxy)ethyl]trimethylammonium chloride (ADAM-Cl), 2-(dimethylamino)ethyl acrylate benzylchloride, 2-(dimethylamino)ethyl acrylate dim ethyl sulphate, 2-dimethylaminoethyl methacrylate (MADAM), [2-(methacryloyloxy)ethyl]trimethylammonium chloride (MADAM-Cl), 2-dimethylaminoethyl methacrylate dim ethyl sulphate, [3-(acryloylamino)propyl]trimethylammonium chloride (APTAC), [3-(methacryloylamino)propyl]trimethylammonium chloride (MAPTAC) and diallyldimethylammonium chloride (DADMAC).

8. The method according to claim 1, wherein the anionic groups of the amphoteric polyacrylamide originate from monomers selected from unsaturated mono- or dicarboxylic acids selected from a group consisting of, acrylic acid, maleic acid, fumaric acid, itaconic acid, aconitic acid, mesaconic acid, citraconic acid, crotonic acid, isocrotonic acid, angelic acid and tiglic acid.

9. The method according to claim 1, wherein the amphoteric polyacrylamide is obtained by gel polymerisation, where the content of non-aqueous solvent in the reaction mixture is less than 10 weight-%.

10. The method according to claim 1, wherein the polymer product has a polymer content of at least 25 weight-%.

11. The method according to claim 1, wherein the water-soluble polymer product comprising amphoteric polyacrylamide is dissolved in water so as to obtain an aqueous treatment solution, which has a pH value of 2.5-5.

12. The method according to claim 1, further comprising adding inorganic microparticles to the fibre suspension.

13. The method according to claim 1, wherein the fibre suspension comprises at least 50 weight-%, of recycled fibre material, being old corrugated containerboard or mixed waste, based on dry paper or paperboard.

14. The method according to claim 1, wherein the fibre suspension comprises recycled fibre material, which comprises more than 0.02 mg/g of hydrophobic substances having particle size in the range of 10-150 μm, calculated on basis of recycled fibre material as dry, of recycled fibre material as dry.

15. The method according to claim 1, wherein the fibre suspension comprises fibres obtained by kraft and/or mechanical pulping process(es).

16. The method according to claim 1, wherein the amphoteric polyacrylamide is added to the fibre suspension having consistency of above 14 g/l or stock component used to prepare the fibre suspension of a paper or board machine.

17. The method according to claim 1, wherein the amphoteric polyacrylamide is used in amount of 100-2000 g/ton produced paper or board.

18. The method according to claim 1, wherein the amphoteric polyacrylamide in the polymer product comprises 5-14 mol-% of structural units derived from cationic monomers and 1-4 mol-% of structural units derived from anionic monomers.

* * * * *